June 11, 1968

E. J. MARTIN ET AL 3,387,752

FISH STRINGER AND CONVEYING DEVICE

Filed Feb. 6, 1967

INVENTOR.
EDWARD J. MARTIN
ERNEST L. MALONE
BY

ATTORNEYS

June 11, 1968     E. J. MARTIN ET AL     3,387,752
FISH STRINGER AND CONVEYING DEVICE
Filed Feb. 6, 1967     2 Sheets-Sheet 2
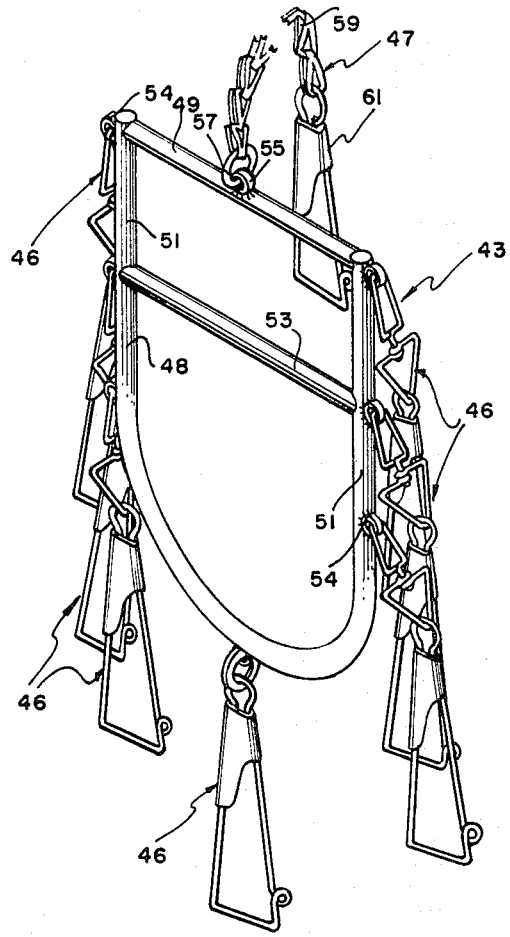
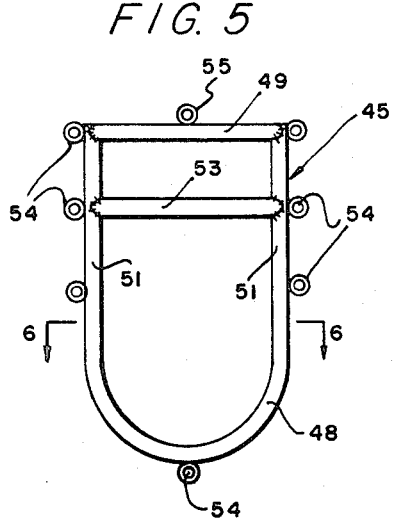
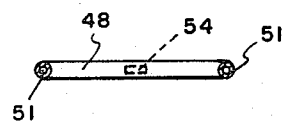
INVENTOR.
EDWARD J. MARTIN
BY ERNEST L. MALONE
ATTORNEYS

United States Patent Office 3,387,752
Patented June 11, 1968

3,387,752
FISH STRINGER AND CONVEYING DEVICE
Edward J. Martin, 3839 W. 11th St., and Ernest L. Malone, 621 W. Central, both of Wichita, Kans. 67203
Filed Feb. 6, 1967, Ser. No. 614,275
3 Claims. (Cl. 224—7)

ABSTRACT OF THE DISCLOSURE

This invention relates to a fish stringer and conveying device usable to connect fish members thereto and having means providing for the ready conveyance thereof and, more particularly, the invention relates to a fish stringer and conveying structure including a support frame having a grip section secured to a downwardly depending support section, means for anchoring the same to a boat or the like, and a plurality of hook assemblies secured in a spaced relationship about the support section providing means for positively spacing and securing fish members making the same easy and comfortable for conveyance. More specifically, this invention relates to a fish stringer and conveyance device having a rigid support frame with a grip portion whereupon the structure is operable to be conveyed in a substantially vertical position for ease in carrying a plurality of fish members.

---

Numerous types of fish stringer structures are known to the prior art operable to receive and hold fish members thereon and having an anchor chain connectible to a boat or the like for maintaining the fish members within the adjacent fishing waters for keeping the same fresh. However, the prior art devices are not provided with a convenient means for conveying the attached fish members from the fishing area. Additionally, the prior art devices are not suitable for ready conveyance when only a partial portion of the hook members thereon are connected to fish members thereby resulting in an unbalanced load which is extremely difficult to carry by the prior art stringers.

In accordance with the present invention, a new fish stringer and conveyance device operable to anchor fish members thereto for ready conveyance from the fishing area is provided with a main support frame having a plurality of hook assemblies secured thereto, each adapted to hold a fish member thereon, and an elongated chain and hook assembly attached to the support frame usable for connection to a boat or the like for maintaining the fish stringer and conveyance device of this invention within the fishing waters to keep any fish members thereon in a fresh, live condition. The support frame is of a picture frame shape having a grip section secured to a downwardly depending support section. The grip section is adapted to be readily grasped by one's hand for conveyance thereof and the chain and hook assembly is secured thereto. The hook assemblies are provided with a first support portion pivotally connected to the support section and a hook member pivotally connected to the support portion so that the hook member is freely rotatable thereon. The fish stringer and conveyance device is normally extended vertically and grasped about the grip section for conveyance whereupon the fish members are extended substantially vertical within a common upright plane so as to provide for the easy conveyance thereof.

In another embodiment of a fish stringer and conveyance device of this invention, a main support frame assembly is provided of tubular construction having a U-shaped main body with hook assemblies secured thereto and the upper open end of the main body is interconnected by a grip portion. A chain and hook assembly is secured to the grip portion for connecting the entire structure to a boat or the like in a conventional manner for maintaining the fish members alive within the fishing waters. A plurality of spaced cylindrical rings are secured to the outer surface of the main body having a support section of the respective hook assemblies secured thereon and hook members are, in turn, pivotally mounted thereon to provide for the free rotatability of the hook members. An additional lateral support member of tubular construction is secured between opposing parallel sides of the U-shaped main body and secured thereto as by welding or the like.

Accordingly, it is an object of this invention to overcome the above-mentioned disadvantages of the prior art devices.

Another object of this invention is to provide a fish stringer and conveyance device having a grip portion operable to be grasped for conveyance of fish members connected thereto in a substantially common vertical plane.

One other object of this invention is to provide a fish stringer and conveyance device having ama in support frame and a plurality of spaced hook assemblies secured thereto adapted to receive fish members thereon whereupon the fish members are maintained in an upright plane.

One other object of this invention is to provide a fish stringer and conveyance device that is simple to use, economical to manufacture, and reliable in operation.

Various objects, advantages and features of the invention will become apparent to those skilled in the art from the following discussion, taken in conjunction with the accompanying drawings, in which:

FIG. 4 is a perspective view of another embodiment of a fish stringer and conveyance device of this invention;

FIG. 5 is an elevational view of the main support assembly of the second embodiment of the fish stringer and conveyance device of this invention; and FIG. 6 is a sectional view taken along line 6—6 in FIG. 5.

Figure 1:
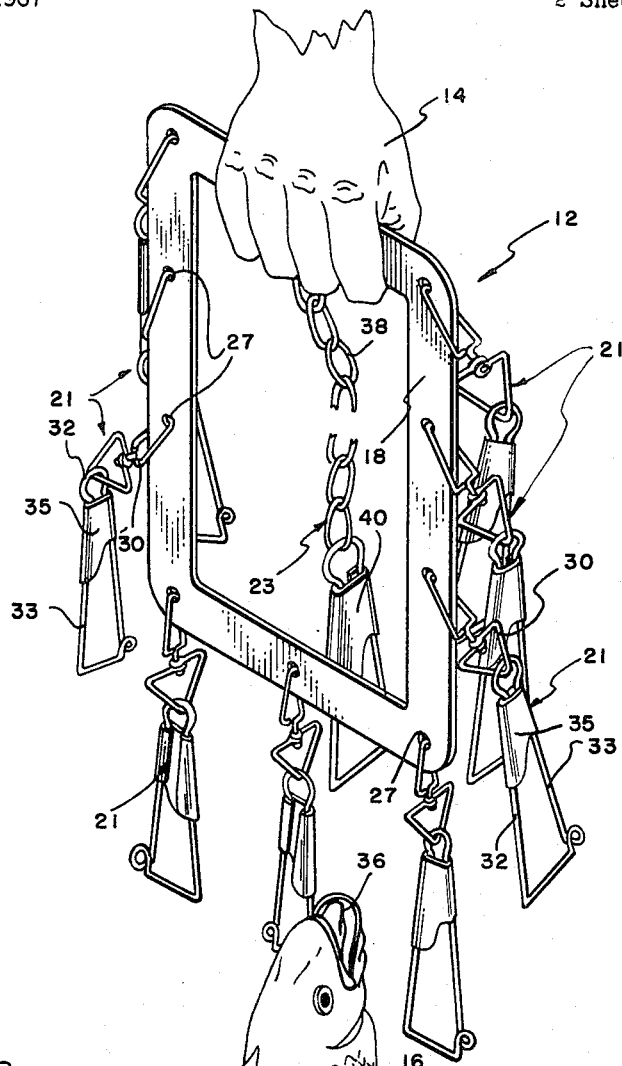
FIG. 1 is a perspective view of the fish stringer and conveyance device of this invention illustrated as being used in carrying a fish member thereon.
Figure 2:
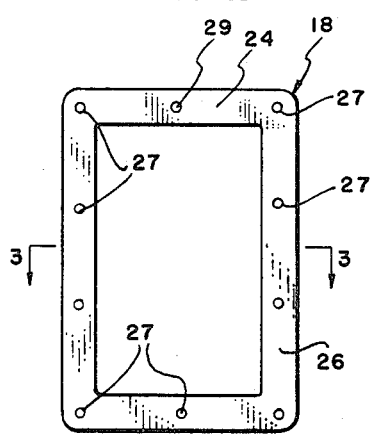
FIG. 2 is an elevational view of a main support assembly of the fish stringer and conveyance device of this invention.
Figure 3:
FIG. 3 is a sectional view taken along line 3—3 in FIG. 2.

The following is a discussion and description of preferred embodiments of the new and novel fish stringer and conveyance devices of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular FIG. 1, a fish stringer and conveyance device of this invention, indicated generally at 12, is illustrated as being grasped and carried by person as indicated by a hand 14 with a fish member 16 connected thereto. It is obvious that a plurality of fish members 16 could be connected to the fish stringer and conveyance device 12 and all would depend therefrom and extend substantially in a common vertical plane.

The fish stringer and conveyance device 12 includes a main support frame or assembly 18 having a plurality of hook assemblies 21 pivotally connected thereto and an elongated chain and hook assembly 23 secured thereto operable for connection to a boat member (not shown) or the like for maintaining the fish members 16 within the available fishing lake or stream to keep the same fresh.

The support frame 18 is of a generally picture frame shape constructed of a sheet material having an upper grip section 24 integral with a downwardly depending support section 26. It is seen that the grip section 24 and the support section 26 extends in a substantially common plane and is provided with a plurality of holes 27 and a mounting hole 29 spaced about the periphery thereof. It is obvious that the support frame 18 could be constructed of an aluminum, sheet steel, plastic or the like material. Each hole 27 is adapted to receive one of the hook assemblies 21 therein.

More specifically, the hook assemblies 21 are constructed of a connector portion 30 mountable through the respective holes 27 and a hook member 32 rotatably connected to the connector portion 30. The hook assemblies 21 are of a substantially conventional type having the hook members 32 provided with a spring biased hook portion 33 which is releasable from a main body 35 to be mounted through a jaw portion 36 of the fish member 16 for attaching the same thereto and the hook portion 33 is held in the clipped or closed position by the main body 35. It is seen that the hook members 32 are freely movable about the respective connector portions 30 and, in turn, the connector portions 30 are also pivotal within the respective holes 27 providing for the free movement of the fish members 16 thereon without the tearing of their jaw portions 36 and subsequent escape. The chain and hook assembly 23 is provided with an elongated conventional chain member 38 having secured to one end a hook member 40 identical to those previously described and the other end is mounted within the mounting hole 29 positioned centrally of the grip section 24.

In the use and operation of the fish stringer and conveyance device 12 of this invention, it is obvious that in normal usage as, for example, within a fishing boat (not shown), the elongated chain and hook assembly 23 is connected to a portion of the fishing boat by the hook member 40 and the remaining portion of the fish stringer and conveyance device 12 is placed within the adjacent fishing water. Subsequently, any fish members 16 caught can be attached to a desired one of the hook assemblies 21 for maintaining the fish members within the water so as to remain alive and fresh. Upon obtaining a plurality of elongated fish members 16 connected to respective ones of the hook members 21, it is obvious that the entire structure can be disconnected from the fishing boat and a person's hand can readily grasp the grip section 24 for carrying the plurality of fish members 16 thereon. It is seen that on conveyance of the fish stringer and conveyance device 12 of this invention, the fish members 16 extend in a substantially vertical plane and the support frame 18 provides a rigid assembly so that the fish members are easily and readily carried in this manner. It is also obvious that the position of the hook members 32 and manner of conveyance is such that the fish members 16 can be easily carried regardless of their length and weight with a minimum amount of effort.

In a second embodiment of a fish stringer and conveyance device 43 of this invention, as illustrated in FIGS. 4–6, a support frame assembly 45 is provided having a plurality of hook assemblies 46 pivotally secured thereto and a chain and hook assembly 47 secured thereto. More specifically, the support frame assembly 45 is of a tubular construction having a main U-shaped tubular main body 48 with the upper open ends thereof interconnected as by welding to a grasp bar 49. Extended between upright parallel legs 51 of the main body 48 is a laterally extended support tube 53 secured thereto as by welding or the like. The outer surface of the main body 48 is provided with a plurality of spaced cylindrical ring members 54 each adapted to receive one of the hook assemblies 46. The hook assemblies 46 are identical to those previously described, namely hook assemblies 21, and further discussion thereof is not deemed necessary.

The grasp bar 49 is also of a tubular construction provided with a centrally positioned upwardly extended ring member 55 adapted to receive a ring 57 connected to one end of a chain member 59 of the chain and hook assembly 47. The opposite end of the chain member 59 is connected to a hook member 61 identical to those previously described.

The fish stringer and conveyance device 43 is used in substantially a similar manner to the first embodiment previously described with the upper grasp bar 49 used for conveyance of the fish members 16 thereon from one location to another.

In the structure of the fish stringer and conveyance device of this invention as illustrated, it is obvious that there are numerous advantages therein as the same can be produced at a low cost and provides means for attaching the same to a fishing boat or dock member for maintaining the fish members in fresh water and, additionally, is readily conveyed through provision of a rigid support frame and grasping section.

As will be apparent from the foregoing description of the preferred embodiments of applicant's new and novel fish stringer and conveyance device, relatively simple and inexpensive means have been provided usable with fish members to retain the same thereon and providing a readily accessible holding or grasping section for the conveyance of the fish members from one location to another. Applicant's construction also results in an economical structure providing for the combination of a stringer and a conveyance means of fish members in a most satisfactory manner.

While the invention has been described in conjunction with preferred specific embodiments thereof, it will be understood that this description is intended to illustrate and not to limit the scope of the invention which is defined by the following claims.

We claim:
1. A fish stringer and conveyance device, comprising:
  (a) a support frame having a grip section secured to a downwardly depending U-shaped support section defining the periphery, an enlarged central opening, said support frame extended in a common plane;
  (b) said support section having a plurality of spaced connecting means; and
  (c) a plurality of hook assemblies secured to said connecting means, each of said hook assemblies having a connector member connected to said connecting means adjacent the outer periphery of said support section, and a hook member pivotally connected to said connector member permitting free rotation while achieving positively spaced relationship of fish members thereon.
2. A fish stringer and conveyance device as described in claim 1, including:
  (a) said grip section having a mounting hole therein;
  (b) a chain and hook assembly secured to said mounting hole having an elongated chain member with a hook member secured to the outer end thereof for anchoring the fish stringer and conveyance device as required; and
  (c) said support frame of a one-piece sheet construction adapted to be extended in a substantially common vertical plane for ease of conveyance with fish members secured thereto and providing positive separation of the same.
3. A fish stringer and conveyance device as described in claim 1, wherein:
  (a) said support frame of a tubular construction having said support section of a U-shape with upper, opposed open ends secured to said grip section;
  (b) said support frame including a support tube extended between opposed legs of said U-shaped support section; and
  (c) said connecting means having cylindrical ring members secured to the outer peripheral surface of said support section in a spaced relationship, and each of said ring members having one of said hook assemblies connected thereto whereby fish members connected thereon are maintained in a spaced relationship during conveyance.

References Cited

UNITED STATES PATENTS

| | | | |
|---|---|---|---|
| 1,407,221 | 2/1922 | Reimers | 224—7 |
| 2,426,298 | 8/1947 | Davy | 224—7 |
| 2,427,715 | 9/1947 | Cooper | 224—7 |
| 2,592,389 | 4/1952 | Budy | 224—7 |
| 2,737,990 | 3/1956 | De Marco | 224—45 |
| 2,796,209 | 6/1957 | Holmes. | |
| 2,797,850 | 7/1957 | Hildenbrand | 224—7 |
| 3,302,837 | 2/1967 | Montgomery | 224—7 X |

HUGO O. SCHULZ, *Primary Examiner.*